April 23, 1929.  J. BOYSEN  1,710,040
AUTOMOBILE MIRROR
Filed May 9, 1927
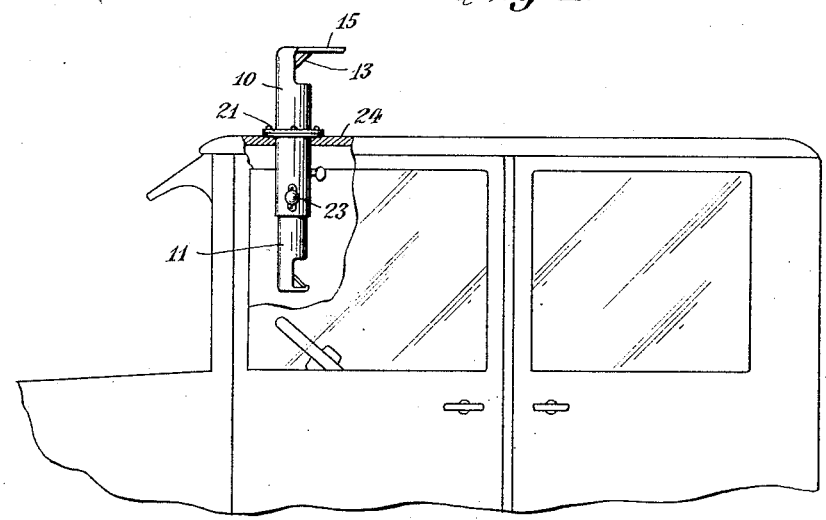
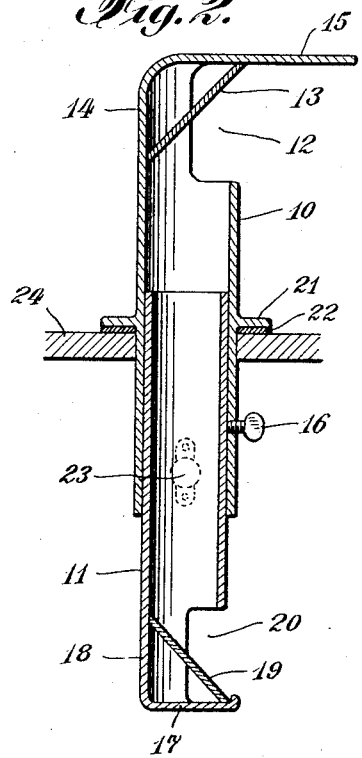
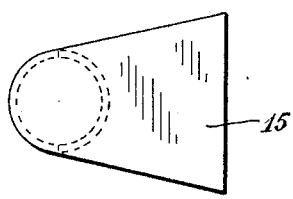
INVENTOR
Jorgen Boysen
BY
Peter M. Boesen
ATTORNEY Patented Apr. 23, 1929.

1,710,040

UNITED STATES PATENT OFFICE.

JORGEN BOYSEN, OF NEW YORK, N. Y.

AUTOMOBILE MIRROR.

Application filed May 9, 1927. Serial No. 189,785.

This invention relates to automobile-mirrors, and has for its object to provide a specimen of mirror, somewhat similar to a periscope, which, when properly adjusted, will at all times keep the driver of a car informed as to the movements that take place in the rear of the automobile as well as in front thereof.

Another object of my invention is to provide a safety-mirror, which will to a great extent eliminate the danger of automobile accidents, at least as far as rear-collisions are concerned, inasmuch as this invention would impart to the driver a clear view of the space behind the car, thereby leaving him at ease during the operation of such car, for instance when backing up or performing a turning movement.

Said device should be suitable for installation in every automobile and the cost of manufacturing the same should be very small.

The advantages of this invention will further appear as the description proceeds.

With the above and other objects in view, this invention consists of the novel features of construction, combination and arrangements of parts, hereinafter fully described, claimed, and illustrated in the accompanying drawings forming parts of this specification, and in which similar characters of reference indicate corresponding parts in all views, and in which:

Figure 1 illustrates my device applied to an automobile. Fig. 2 is a longitudinal transverse sectional view of same, while Fig. 3 is a special top view of my invention.

Referring more particularly to the drawings, 10 and 11 indicate two telescopically arranged tube members, adapted to slide partly one within the other. Thus 10 illustrates a tube having the upper part of its wall cut away to an extent of approximately 180 degrees of the circumference of said tube, in order to permit of an open space 12, whereby the operation of a periscopic-mirror 13 is made possible. The semicylindrical wall 14 opposite the cut away portion has its upper end terminated into a substantially horizontal, flaring roof 15, that serves to prevent any obstruction to the visibility with respect to the mirror 13, such as glaring sunshine or rain, etc.

At the upper corner of said tube-member 10, just beneath the roof is mounted, as shown, a mirror 13 for reflection of the space behind the car; said mirror may be cemented, or kept in place by any other suitable means.

The lower tube-member 11 is adjustably inserted into the tube-member 10, and kept in place by means of a screw 16, as shown; said lower tube-member has a somewhat similar construction as the member 10; thus it has a lower bent bottom member 17, made integral with the semi-cylindrical wall 18, and a mirror 19 mounted similarly to the mirror 13, and adapted to receive the reflections of the latter, which reflections, or images, may be observed by the driver through the opening, or cutaway portion 20, made somewhat similarly to the opening 12 in the upper tube member 10.

The apparatus, ensemble, may be attached to an automobile in such a manner that it is easily visible to the chauffeur, and with that end in view it may be attached either to the windshield by means of fastening screws, or it may, as shown, be inserted through the roof 24 of the car, which latter manner is preferable. In order to keep said apparatus in proper position, when inserted through the roof of a car, I provide the member 10 with an annular flange 21 to form a seat for said device. Suitable means, for inst., a rubber-washer 22 is inserted between said flange and the automobile roof 24 in order to prevent the rain from penetrating into the car. If deemed necessary said flange may be rigidly fastened to the roof of the car by means of screws.

To facilitate the operation of said device so that the chauffeur may at any time have access to look in the lower mirror, I have provided said apparatus with a handle 23 by manipulation of which the driver may turn the apparatus into any suitable position.

It is obvious that changes may be made in the form, construction and arrangement of the several parts, as shown, within the scope of the appended claims, without departing from the spirit of the invention, and I do not therefore limit myself to the construction and arrangement shown and described herein.

What I claim as new, and desire to secure by Letters Patent of the United States, is:

1. In a device of the class described, a periscopic-mirror for automobiles, comprising two substantially tubular members telescopically arranged, and disposed with cutaway semi-cylindrical portions immediate their end surfaces, two cooperating, obliquely positioned mirrors at the top and bottom respectively, flanges angularly bent and adapted to receive and seat the said mirrors, an annular flange formed upon the middle section of the upper member, and adapted to cooperate with a washer and rigidly engage the roof of a car, and means for operatively aligning said members, substantially as and for the purpose set forth.

2. In a device of the class described, a periscopic-mirror for automobiles, comprising two substantially tubular members telescopically arranged, and disposed with cutaway semi-cylindrical portions immediate their end surfaces, two cooperating, obliquely positioned mirrors at the top and bottom respectively, flanges angularly shaped and disposed at the top of the upper member and at the bottom of the lower member and adapted to receive and seat the said mirrors, an annular flange formed upon the middle section of the upper member and adapted to cooperate with a washer and rigidly engage the roof of a car, and means for adjusting said members for cooperation, substantially as shown and described.

Signed at New York city, in the county of New York and State of New York, this 26th day of April, A. D. 1927.

JORGEN BOYSEN.